United States Patent Office 3,426,212
Patented Feb. 4, 1969

3,426,212
RADIATION CONVERTER COMPRISING TRANSPARENT PARALLEL LAYERS CONTAINING FLUORESCENT SUBSTANCES
Ruth Elizabeth Barry Klaas, Arden Hills, Minn.
(10 Oriole Drive, Wyomissing, Pa. 19610)
Continuation of application Ser. No. 454,299, May 10, 1965. This application Mar. 14, 1968, Ser. No. 713,259
U.S. Cl. 250—226                        13 Claims
Int. Cl. H01j 5/16; G01n 21/00

ABSTRACT OF THE DISCLOSURE

A radiation converter is disclosed comprising at least two substantially parallel layers each comprising (a) solid polymeric material that is substantially transparent at least in the near ultraviolet and visible regions of the spectrum, and (b) fluorescent substance, said layers containing different fluorescent substances and disposed in optical relationship and adjacent to each other. In its simplest embodiment, the radiation converter is useful for converting electromagnetic radiation of wavelength between about 2900 A. and about 15,000 A. into radiation of different wavelength; in more sophisticated embodiments, the radiation converter is useful for converting electromagnetic radiation into electrical energy, for effecting useful chemical reactions, and for other purposes.

---

Figure 1:
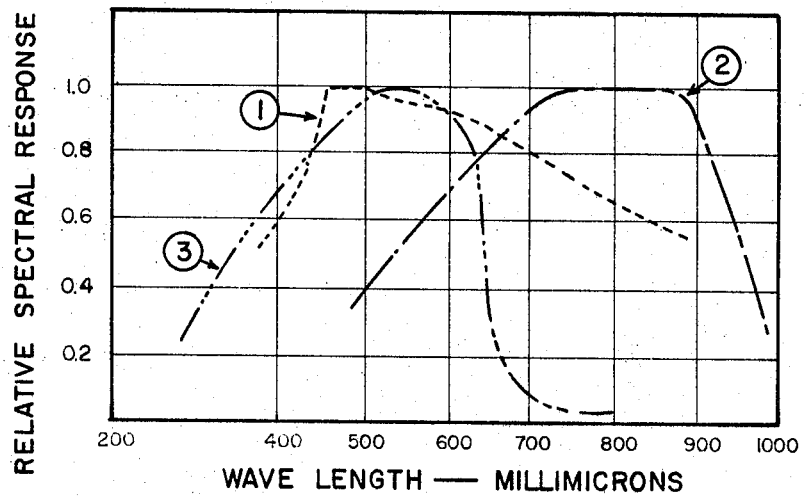

This application is a continuation of my copending application for United States Letters Patent Ser. No. 454,299, filed May 10, 1965, which in turn is a continuation-in-part of my application for United States Letters Patent Ser. No. 280,129, filed May 13, 1963, and since abandoned, which in turn is a continuation-in-part of application for United States Letters Patent Ser. No. 819,831, filed June 12, 1959, and issued as United States Letters Patent 3,089,280 on May 14, 1963.

This invention relates to novel compositions of matter and devices reactive with electromagnetic radiation and methods of using same, and in particular to a novel radiation converter and methods of using same.

In one broad aspect, this invention relates to novel compositions comprising two materials—typically, resonating aromatic substances like optical brightening material, and electronically metastable substances like acrylic plastic—which in combination act in synergistic fashion to produce a greater effect, on and/or by activation by, light of appropriate wave length or wave lengths, than the sum of the effects which might reasonably be expected by consideration of the individual components thereof. In more specific aspects, this invention relates to combinations comprising organic plastic and a plurality of fluorescent materials, to combinations comprising optical brightening material and/or other fluorescent dyestuff and electronically metastable metallic ions, to combinations comprising acrylic plastic, rare earth salt, and a plurality of fluorescent materials, in all of which cases the total effect observed is greater than the sum of the individual components thereof. Novel methods of using such combinations are also set forth herein.

It is an object of this invention to provide a method of converting light energy by passage through compositions of matter comprising organic plastic and a plurality of fluorescent materials, which under some conditions preferably may contain rare earth salt.

A specific object of this invention is to provide a method of converting light energy into chemical or electrical energy by a process involving Stokes fluorescence.

Still a further object of this invention is to provide a method of converting light energy to chemical or electrical energy by a process involving the production of anti-Stokes fluorescence, and passage of said anti-Stokes fluorescence into a chemical system (for conversion into chemical energy) or into a photocell (for conversion into electrical energy).

Still another object of this invention is to provide methods of, and devices capable of, converting radiant energy (including light energy) into chemical( including biochemical) energy or into electrical energy by a process involving the production of fluorescence (Stokes and/or anti-Stokes), generally in a cascade system involving a plurality of fluorescent materials, and passage of such fluorescence into a chemical system (for conversion into chemical energy) or into a photocell or other radiation converter (for conversion into electrical energy).

All of these objects, and other objects, may be attained by the practice of my invention as described herein.

It is well known in the art that photosensitor-type devices, such as photocells, photochemical cells, and even chlorophyll-containing plants, in most cases have a spectral response (i.e., absorption characteristic as a function of wave length at which maximum sensitivity, power output, or such like is attained) that is different from the spectral distribution of energy wave lengths in the radiation available. Two specific examples of this fact are shown in FIGURE 1; it is seen in FIGURE 1 that, although the spectral content of sunlight at the earth's surface, as shown in curve 1, peaks in the region around 600 millimicrons of wave length, the spectral response (region of greatest sensitivity and/or efficiency) of silicon solar cells, as shown in curve 2, is largely in the infrared region of wave lengths longer than 600 millimicrons, whereas a significant proportion of the spectral response of selenium photocells, as shown in curve 3, is in the region of wave lengths shorter than 600 millimicrons. In photochemical applications, it frequently happens that best efficiency is obtained, as in the photochemical decomposition of water by cerium ions, in the ultraviolet region of the spectrum.

Devices, such as fluorescent light bulbs (see Beese, U.S. Patent 2,151,496, issued Mar. 21, 1939), in which radiant energy of relatively short wave length is converted by solid phosphors into visible light have long been known. The principle of using cascade-type phosphor screens, in which an electron beam or such like excites one layer of solid phosphors to emit light, which light then excites an adjacent layer of solid phosphors to emit light of a different wave length also has long been known, and has been used in cathode ray tubes of various types. (See Nicoll, U.S. Patent 2,476,619, issued July 19, 1949; Sheldon, U.S. Patent 2,603,757, issued July 15, 1952; Sheldon, U.S. Patent 2,739,243, issued Mar. 20, 1956.) Devices utilizing fluorescent organic compounds as chemical scintillators to detect radiant energy rays of certain types or high-energy particles are also known (Hyman, U.S. Patent 2,710,284), and attempts have been made to enhance the efficiency of photocells by encasing such cells in plastic shaped somewhat as an optical lens. (See Ekstein, U.S. Patent 2,668,867, issued Feb. 9, 1954.) Organic fluorescent filters also have been used to bring into better mutual agreement the respective maxima of radiation source and photosensitor (see Summer, "Photosensitors," Chapman & Hall, Ltd., London, 1957, page 389 seq.), and a double-layer color filter has been used over a photocell in which only part of the photocell was covered by one or both of the filters (Dresler, E. T. Z., 54, 476 (1933)). Sensitization of photocells with organic dyestuff has been reported as an exploratory project by C. Bosch (McCarthy, Townsend, and Mertz, FIAT Final Report No. 294), and the constant response of sodium salicylate to equal amounts of radiation over a wide range of wave lengths has been used to sensitize special-purpose photocells with potassium cathodes to ultraviolet radiation (Chevallier and Dubouhoz, Compt. rend., 194, 452 (1932), and Dejardin, Rev. gen. elec., 34, 629 (1933)). In the emission spectra of certain fluorescent dyestuffs in poly(methyl methacrylate), distribution of intensity of the fluorescence as a function of wave length has been found to be essentially independent of the wave length of the incident irradiation (Kawski, of Pedagogu University of Gdansk, Poland, Bull. Acad. Polon. Sci., Ser. Sci., Math., Astron., Phys., 11 (8), 567–72 (1963)—C.A., 60, 8796g), and considerable study has been given to the anti-Stokes fluorescence of chlorophyll (Frackowiak and Marszalek, of Copernicus University, of Torun, Poland, Bull. Acad. Polon. Sci., Ser. Sci., Math., Astron., Phys., 9, 53–5—C.A., 59, 131e (1963)), the influence of various salts on the photoluminescence of fluorescein (Glowacki and Kaminska, Acta Phys. Polon., 23, (1), 43–51 (1963) and on the activity of fluorescein in chlorophyll-containing plants (Sellei, U.S. Patent 2,190,890, issued Feb. 20, 1940, and Green, U.S. Patent 2,222,225, issued Nov. 19, 1940).

Despite the wealth of information in the prior art in this general field, and the obvious need for a radiation converter that could absorb broad bands of wave lengths at the spectral distribution of radiant energy available and convert the energy thus absorbed into other electromagnetic energy, or electrical energy, or chemical energy, no really efficient and acceptable device for so doing is available today.

Figure 2:
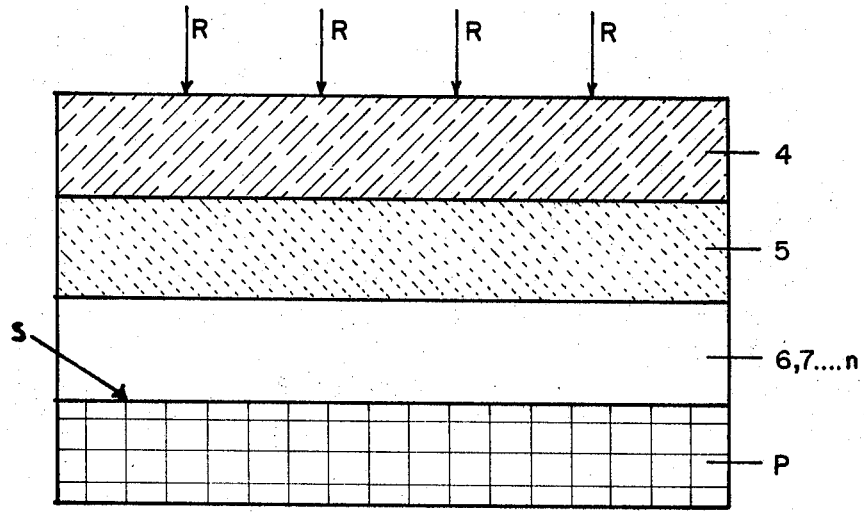

The radiation converter of my invention consists of a photosensitor P (see FIGURE 2) having a plurality of fluorescent light filters 4, 5, and optionally 6, 7 . . . n interposed between its photosensitive element S and incident radiation R. In its simplest embodiment, my converter consists of three elements: (1) radiation filter element 4, comprising clear acrylic-type plastic containing fluorescent dyestuff having an absorption spectrum matching as closely as possible the spectral distribution of energy in incident radiation R, and having a fluorescence and transmission (combined) spectrum that matches as closely as possible the absorption spectrum of radiation filter element 5 located closer to photosensitor P than 4; (2) said radiation filter element 5 having a fluorescence and transmission (combined) spectrum that matches as closely as possible the optimum spectral response (i.e., the distribution of intensities of various wave lengths that maximizes the performance and/or efficiency) of photosensitor P; and (3) photosensitor P itself. Additional radiation filter 6, 7 . . . n optionally may be interposed between radiation filter element 5 and photosensitor P, as long as the absorption spectrum of each filter element matches as closely as possible the fluorescence and transmission (combined) spectrum of that adjacent filter element that is more remote than it from photosensitor P and yet has a fluorescence and transmission (combined) spectrum that matches as closely as possible the absorption spectrum of that adjacent filter element that is closer than it, in the filter elements/photosensor train, to the photosensitor P, and also as long as the fluorescence and transmission (combined) spectrum of the radiation filter element next to photosensitor P, in the train of filter elements/photosensitor, matches as closely as possible the optimum spectral response of said photosensitor P.

The outstanding advantage of my invention is that it utilizes, in a cascade arrangement, a much greater proportion of incident radiation than can be converted by the relatively inefficient and generally substantially opaque pigment-type phosphors of the prior art, which even in cascade-type arrangements operating on a broad band of wave lengths of incident radiation managed to absorb and utilize only a relatively narrow band or bands of wave lengths. Organic dyestuffs characteristically have relatively broad absorption bands, and I have discovered how to broaden and/or shift them in radiation detectors by using acrylic-type plastic, fluorescent dyestuff, and certain metallic ions, especially rare earth ions; light not actually absorbed by a given radiation filter element may be transmitted to successive filter elements in the stack of filter elements, and need not be lost as heat, as usually happens in cascade-type phosphor-based arrangements of the prior art. Acrylic-type plastics comprising certain metallic ions and/or fluorescent dyestuff exhibit a synergistic type of effect in this kind of service, and generally are to be greatly preferred, although, in handling certain types of radiation, it may be useful to use cascade-type devices of the general kind described herein, but using clear inorganic glass instead of acrylic plastic, and a fluorescing ion such as uranyl in place of the fluorescent organic dyestuff and/or rare earth ions of my preferred embodiments. Use of clear plastics (e.g., styrene polymers) in the place of acrylic plastics as defined herein, in radiation converters of the general kind described herein, will generally give unsatisfactory results in comparison to the results obtainable with acrylic plastic. In some cases, it may be desirable to shape the filter element trains, as described herein, into lens-shaped bodies in order to maximize the intensity of the radiation available to the photosensitive element S of photosensitor P.

As used in this specification and the appended claims, the term "acrylic plastic" is intended to include the true "acrylic" materials (that is, plastics having as a repeating unit in the polymer chain the acrylyl or

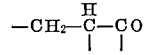

group), methacrylic plastics, polymers formed from a plurality of monomers at least one of which, comprising at least about 25 percent by weight of the total, is acrylic monomer, methacrylic monomer, acrylonitrile, or the like, and like polymers.

Beyond the above general definition and explanation of the term "acrylic plastic," no attempt is made herein to define the types of acrylic plastics which must be employed in making radiation filter elements, since the type of acrylic plastic needed will be obvious—at least as to general type and physical properties—to those versed in the art and provided with the benefit of this disclosure: see Billmeyer, "Textbook of Polymer Chemistry," Interscience Publishers, Inc., New York, 1957; Schildknecht, "Vinyl and Related Polymers," John Wiley & Sons, Inc., New York, 1952; Riddle, "Monomeric Acrylic Esters," Reinhold Publishing Corp., New York, 1954; and bibliographical references in those books. For example, it will be evident to those skilled in the art that the average molecular weights of the plastics of my radiation converter should fall in the range above about 10,000, and perferably in the range of about 150,000 to 1,000,000 or even higher.

As used in this specification and the appended claims, my terms follow generally the nomenclature and usage employed in the article (controlling reference), "Fluorescence and Phosphorescence," in Encyclopedia Brittanica, Encyclopedia Brittanica, Inc., Chicago, 1958, volume 9, pages 422 to 427, as supplemented by the book, "Photosensitors," by W. Summer, Chapman & Hall, Ltd., London, 1957. My term "optical brightening material" refers to dyestuff which has the property of absorbing ultraviolet radiant energy and re-emitting (fluorescing) light energy in the visible—generally in the blue, but in some instances farther toward the red region of the spectrum, in such a fashion so that the dyestuff contributes (to the unaided human eye) essentially no color at all, or at most no more than a faint suggestion of color, to an object treated with relatively small amounts of said dyestuff. Most of the commercially available dyestuffs of this type are derivatives of diaminostilbene (see U.S. Patent 2,703,801), dibenzothiophene (see U.S. Patents 2,563,493 and 2,702,-759), and like materials of complicated molecular structure well known in the art.

Optical brightening materials are especially useful when the radiation to be converted is in the ultraviolet range, and the photosensitor to be affected has maximum sensitivity and/or efficiency in the visible or infrared region;

other fluorescent dyestuffs are especially adapted for use in my radiation converter when the radiation to be converted is in the visible or infrared region. As noted above, acrylic plastics are broadly preferred in the practice of this invention, with clear inorganic glasses sometimes needed as in certain applications involving uranyl ion or such like (see Rabinowitch and Belford, "Spectroscopy and Photochemistry of Uranyl Compounds," Macmillan, New York, 1964).

"Electronically metastable" substance, as that term is used herein, refers to material which, under the conditions set forth, is relatively "electron-rich" or "electron-poor" (e.g., acrylic plastic containing carbonyl or nitrile groups) in such a fashion, and to such a degree, that substantial synergistic interaction with appropriate types of aromatic resonating dyestuff (as described herein) occurs on irradiation of the system with light of the appropriate wave length or wave lengths. It will be readily appreciated, of course, that the condition of "electronic metastability" of any one component of a given system will depend on the conditions of use and character of other components of the system.

For the purposes of this disclosure, the spectral regions are defined, on the basis of W. W. Coblentz, J. Am. Med. Soc., 123, 378 (1946), as follows:

| Spectral region: | Approximate range of wavelengths, A. |
|---|---|
| Far ultraviolet | 1800–2900 |
| Near ultraviolet | 2900–3900 |
| Visible | 3900–7600 |
| Near infrared | 7600–15,000 |
| Far infrared | 15,000–150,000 |

EXAMPLES

Five hundred and forty grams of distilled water was charged into a 1-liter reaction flask fitted with gas inlet tube, mechanical stirrer, and reflux condenser. Three grams lauryl sulfate was dispersed in the water, and 86 grams methyl methacrylate then added. Stirring was commenced at a rate of 300 revolutions per minute, the system flushed with nitrogen gas, and heated to 50° C. One gram potassium persulfate and 0.3 gram sodium bisulfite were added, and the temperature raised to 60° C. over a period of 10 minutes with continued mechanical agitation and flushing with nitrogen. Over the next 40 minutes, the temperature was gradually raised to 75° C., and an additional 0.3 gram potassium persulfate and 0.1 gram sodium bisulfite were then added. Finally, the temperature was raised to 90° C. over a period of 10 minutes, and the reaction mass then cooled to room temperature. The product of this reaction was a finely dispersed emulsion of polymethyl methacrylate (more accurately, methyl polymethacrylate) having about 10.7 percent of polymer solids by weight. This emulsion was assigned the designation "Latex A."

The polymer of "Latex A" was characterized by air-drying a sample on a polyperfluoroethylene release film over anhydrous calcium chloride, and then noting its brittle point (in degrees centigrade), its swelling-solubility characteristics in o-xylene and o-xylene/benzene, and the viscosity of an o-xylene solution containing 2.5 percent by weight of the polymer, in comparison with a commercial standard. On the basis of these measurements, the average molecular weight of the polymer of "Latex A" was estimated to be approximately 12,000.

"Latex D" was made by exactly the same procedure as that used in the preparation of "Latex A," except that ethyl acrylate monomer, rather than methyl methacrylate monomer, was polymerized. The polyethyl acrylate (more accurately, ethyl polyacrylate) obtained was characterized by methods analogous to those employed in characterizing the polymer of "Latex A" above. The average molecular weight of the polymer of "Latex D" was estimated to be about 11,000. (See Riddle, "Monomeric Acrylic Esters," Reinhold Publishing Corp., New York, 1954, page 63; Billmeyer, "Textbook of Polymer Chemistry," Interscience Publishers, Inc., New York, 1957, pages 128 to 139.)

"Latex E" was made by mixing equal volumes of "Latex A" and "Latex D."

"Latex H" was prepared by adding to 100 grams of "Latex E" 4 grams of "Optical Brightening Material II," the sodium salt of 2-o-phenoxy-4-N-morpholinyl-1,3,5 triazyl (6) diaminostilbenedisulfonic acid—i.e., a derivative of the sodium salt of 2,4-dichloro 1,3,5 triazyl (6) diaminostilbenedisulfonic acid in which one of the two chlorine atoms attached to each triazyl ring has been replaced by a phenoxy group tied to the triazyl ring through oxygen of the phenoxy group, while the other chlorine atom attached to each triazyl ring has been replaced by a morpholinyl group bound to the triazyl ring through the nitrogen of the morpholinyl group, said "Optical Brightening Material II" having been made as described in Example 1 of U.S. Patent 2,703,801.

"Latex I" was a commercial polymethacrylate latex generally equivalent to "Latex A," and in the work described in this disclosure was used more or less interchangeably with "Latex A." "Latex I" ordinarily is supplied at a solids content of 38 percent, and wherever "Latex A" and "Latex I" were interchanged, solids contents were adjusted accordingly. Molecular weight of "Latex I" was found to be in the range somewhat above 100,000.

"Latex J" was a commercial polyacrylate latex generally equivalent to "Latex D," and in the work described in this disclosure was used more or less interchangeably with "Latex D." "Latex J" ordinarily is supplied at a solids content of 46 percent, and wherever "Latex D" and "Latex J" were interchanged, solids contents were adjusted accordingly. Molecular weight of "Latex J" was found to be in the range somewhat above 100,000.

"Optical Brightening Material III" was a commercial brightening material equivalent for the purposes of this invention to "Optical Brightening Material I," the sodium salt of 2,4-di-o-phenoxy-1,3,5 triazyl (6) diaminostilbenedisulfonic acid—i.e., a derivative of the sodium salt of 2,4-dichloro-1,3,5-triazyl (6) diaminostilbenedisulfonic acid in which the chlorine atoms have been replaced by phenoxy groups bound to the triazyl rings through oxygen atoms of the phenoxy groups, the said "Optical Brightening Material I" having been made by the procedure set forth in Example 3 of U.S. Patent 2,703,801.

"Mixed Brighteners V" was a dry mixture of "Optical Brightener II" (25 parts by weight), "Optical Brightener III" (25 parts by weight), and 50 parts by weight of an optical brightener equivalent, for the purposes of this specification, to that prepared in Example 5 of U.S. Patent 2,703,801, which dyestuff, perhaps less conveniently than might be desired, could be known as the sodium salt of 2-o-phenoxy-4-N-piperidyl-1,3,5-triazyl (6) diaminostilbenedisulfonic acid—i.e., a derivative of the sodium salt of 2,4-dichloro 1,3,5-triazyl (6) diaminostilbenedisulfonic acid in which one of the two chlorine atoms attached to each triazyl ring has been replaced by a phenoxy group, while the other chlorine atom attached to each triazyl ring has been replaced by a piperidyl group attached to the triazyl ring through the nitrogen of the piperidyl group.

"Rare Earth Salt VI" was a commercial mixture of rare earth sulfate, having approximately the following content of the various rare earths, calculated as oxides:

| | Percent |
|---|---|
| $CeO_2$ | 20.6 |
| $La_2O_3$ | 10.3 |
| $Nd_2O_3$ | 7.3 |
| $Pr_6O_{11}$ | 2.2 |
| $Sm_2O_3$ | 1.3 |
| $Gd_2O_3$ | 0.9 |
| $Y_2O_3$ | 0.1 |
| Other rare earth oxides | 0.3 |

"Surfactant VII" was a common commercial surfactant of the type defined in claim 1 of U.S. Patent 2,937,098: any surfactant so defined was found to be satisfactory.

Films F-12 to F-40 were obtained in the following manner: 1 cubic centimeter of each of the liquid formulations given in Table I of this specification was poured out, in separate areas for each of the polishes, on plates of flat level glass about 3 inches by 4 inches, said glass having been sprayed with a polyperfluoroethylene release coating. After 24 hours of air drying, the film (if any) was stripped off with a razor blade, and mounted in a cardboard frame.

TABLE I

| Film No. | Water (g.) | Optical Brightener III (g.) | Mixed Brightener V (g.) | Rare Earth Salt VI (g.) | Surfactant VII (g.) | Latex I (g.) | Latex J (g.) |
|---|---|---|---|---|---|---|---|
| 12 | 99 | | | | | 50 | 50 |
| 13 | 99 | 1 | | | | 50 | 50 |
| 14 | 99 | | 1 | | | 50 | 50 |
| 15 | 99 | | | 1 | | 50 | 50 |
| 16 | 99 | | | | 1 | 50 | 50 |
| 17 | 98 | 1 | | 1 | | 50 | 50 |
| 18 | 98 | | 1 | 1 | | 50 | 50 |
| 19 | 97 | 1 | | 1 | 1 | 50 | 50 |
| 20 | 97 | | 1 | 1 | 1 | 50 | 50 |
| 21 | 99 | | | | | 50 | 50 |
| 22 | 99 | | | 0.1 | | 50 | 50 |
| 23 | 98 | 2 | | | | 50 | 50 |
| 24 | 98 | | 2 | | | 50 | 50 |
| 25 | 98 | 2 | | 0.1 | | 50 | 50 |
| 26 | 98 | | 2 | 0.1 | | 50 | 50 |
| 27 | 96 | 4 | | | | 50 | 50 |
| 28 | 96 | | 4 | | | 50 | 50 |
| 29 | 96 | 4 | | 0.1 | | 50 | 50 |
| 30 | 96 | | 4 | 0.1 | | 50 | 50 |
| 31 | 92 | 8 | | | | 50 | 50 |
| 32 | 92 | | 8 | | | 50 | 50 |
| 33 | 92 | 8 | | | | 50 | 50 |
| 34 | 92 | | 8 | 0.1 | | 50 | 50 |
| 35 | 99 | | | | | 75 | 25 |
| 36 | 99 | | | 0.1 | | 75 | 25 |
| 37 | 96 | 4 | | | | 75 | 25 |
| 38 | 96 | | 4 | | | 75 | 25 |
| 39 | 96 | 4 | | 0.1 | | 75 | 25 |
| 40 | 96 | | 4 | 0.1 | | 75 | 25 |

In addition, films were produced by drying, by exactly the same procedure described above for the production of Films F-12 to F40, mixtures formulated by simple mixing of the ingredients given under each of the film numbers below, in the order given from top to bottom in each case.

Film F-42:                                                      G.
    Water _____ 99
    Fluorescent Dye VIII (fluorescein) _____ 1
    Latex I _____ 50
    Latex J _____ 50

Film F-43:
    Water _____ 99
    Mixed Dyes IX (50 parts of fluorescein, 25 parts eosin, 25 parts diethyl m-aminophenolphthalein hydrochloride) _____ 1
    Latex I _____ 50
    Latex J _____ 50

Film F-44:
    Water _____ 98
    Fluorescent Dye VIII _____ 1
    Rare Earth Salt VI _____ 1
    Latex I _____ 50
    Latex J _____ 50

Film F-45:
    Water _____ 98
    Mixed Dyes IX _____ 1
    Rare Earth Salt VI _____ 1
    Latex I _____ 50
    Latex J _____ 50

Film F-46:
    Water _____ 97
    Fluorescent Dye VIII _____ 1

Film F-46—Continued
    Rare Earth Salt VI _____ 1
    Surfactant VII _____ 1
    Latex I _____ 50
    Latex J _____ 50

Film F-47:
    Water _____ 97
    Mixed Dyes IX _____ 1
    Rare Earth Salt VI _____ 1
    Surfactant VII _____ 1
    Latex I _____ 50
    Latex J _____ 50

Film F-48:
    Water _____ 94
    Optical Brightener III _____ 1
    Mixed Brighteners V _____ 1
    Fluorescent Dye VIII _____ 1
    Mixed Dyes IX _____ 1
    Rare Earth Salt VI _____ 1
    Surfactant VII _____ 1
    Latex I _____ 50
    Latex J _____ 50

Additional films were made by blending some of the mixtures previously described herein with an aqueous extract, presumably containing chlorophyll, obtained by grinding up about 25 grams of green fresh leaf of *Philodendron cordatum* in an ordinary sausage grinder set to mince the leaf in as small pieces as possible, allowing the ground-up leaf to steep at room temperature for four hours in 80 g. water, and then centrifuging the mixture for five minutes as rapidly as possible in a small hand centrifuge of the type ordinarily used in the Babcock test for the fat content of milk. In each case, a latex mixture from one of the previously set out film-making procedures constituted 80 percent of the blend employed to make up chlorophyll-containing films; the other 20 percent of the blend to make up such films was supernatant liquor from the centrifugation of the *Philodendron cordatum* extract. Each of these blends was then dried into film form in exactly the same procedure as that set forth above for the production of Films F-12 to F-40. In the tabulation below, the column at left sets forth identification numbers of chlorophyll-containing films, and the column of figures at right indicates, opposite each of the chlorophyll-containing films, the identification number of the film made with 100 percent of the mixture that in the present series of chlorophyll-containing film constructions accounted for only 80 percent of the blend employed to make the chlorophyll-containing film identified in the left-hand column.

Film Number
 (chlorophyll-containing):[1]                Film Number [2]
  F-49 _____ F-12
  F-50 _____ F-42
  F-51 _____ F-43
  F-52 _____ F-13
  F-53 _____ F-14
  F-54 _____ F-15
  F-55 _____ F-16
  F-56 _____ F-44
  F-57 _____ F-45
  F-58 _____ F-17
  F-59 _____ F-18
  F-60 _____ F-46
  F-61 _____ F-47
  F-62 _____ F-19
  F-63 _____ F-20
  F-64 _____ F-48

[1] 80% latex blend/20% chlorophyll extract.
[2] Made with 100% of the same latex mixture which constituted 80% of the chlorophyll-containing film identified by Film Number in left-hand column directly opposite.

Films produced by evaporating to dryness various compositions of matter described herein were employed to convert light energy, either from short wave length to relatively long wave lengths, or from long wave length to relatively shorter wave lengths, or both, and thereafter the converted light was employed to produce thermal energy, and/or chemical energy, and/or electrical energy. It should be appreciated that measurement of the electrical output of a photocell is an overall measurement of the total energy being fed into the cell, integrated across the entire band of wave lengths, as affected by the spectral response of the cell, and that careful analysis of the results obtained, as set forth in the bulk of the examples below, in the light of FIGURE 1 and the known fact that passage of light through any plastic filter tends to produce attenuation thereof, may be required to determine the cascade effect at the dilute concentrations of dyes used. In actual practice, of course, the fluorescent dyestuffs should be loaded into the films up to solids concentrations as high as 30 percent: such films have been made along the lines indicated in the table of examples below, and the magnitude of the effects obtained is remarkable.

Example 1

Film F-41 (approximately 2 mils thick) was prepared by evaporating to dryness, at room temperature on a polyperfluoroethylene release film, a mixture of 100 grams of "Latex H" approximately 16 mils thick. Generally parallel results were obtained by irradiation under substantially oxygen-free conditions, at a distance of 4 inches under a 275-watt ultraviolet (mercury-arc) lamp, on the one hand, of an aqueous solution ("Solution 12X") 0.1 molar with respect to ferrous sulfate, and 0.3 normal with respect to sulfuric acid, and, on the other hand, of an aqueous solution ("12Y") 0.1 molar with respect to ferrous sulfate, 0.3 normal with respect to sulfuric acid, and containing 0.1 percent by weight of "Optical Brightening Material I." On dilution and slow neutralization of the two solutions with very dilute standard sodium hydroxide solution, however, there developed in "12X" but not in "12Y," just before precipitation of voluminous amounts of blue-green ferrous hydroxide, a yellowish tinge—apparently ferric hydroxide. It will be obvious to those versed in the art and provided with the benefit of this disclosure that (assuming some slight oxidation occurred by reason of the limited contact of both solutions with ordinary atmosphere in both cases above), just as inclusion of optical brightening material in systems of this general type has the effect of tending to desensitize the system to Riggs-Weiss-type action under ultraviolet light (see Riggs and Weiss, J. Chem. Phys., 20, 1194–99 (1952), and Weiss, Nature, 136, 794 (1935), so would material giving rise to substantial amounts of anti-Stokes fluorescence have the effect of sensitizing such systems to Riggs-Weiss-type activity on irradiation by light of longer wave lengths, and thus make possible an increase in the sensible yield of usable chemical and/or electrical energy, or such like, therefrom. Similar results were obtained by irradiating two identical Riggs-Weiss systems with ultraviolet light, but interposing Film F-41 between the light and one of the oxygen-free (actually, substantially oxygen-free) aqueous solutions 0.1 molar with respect respect to ferrous sulfate and 0.3 normal with respect to sulfuric acid, there was some evidence of reduction (of the traces of oxygenated material derived from slight exposure to atmosphere) in the solution into which the ultraviolet light had been passed directly, without any interposed light filter such as Film F-41.

The effect of the optical brightening material both in Film F-41, in the experiment outlined above, and in the solution "12Y" above, of course, was to shift the preponderance of radiation actually hitting the solution from the ultraviolet range toward the infrared region of the spectrum, with evident advantages in various analogous utilization of such energy; such utilizations (employing infrared more advantageously than radiation of shorter wave length) might include, for example, certain processes for solar distillation of sea water. In other instances, dyestuffs "reversing" the action of typical optical brightening materials of course could be selected to shift part of the incident radiation to the far ultraviolet, with increased efficiency, rather than decreased efficiency, in photochemical conversions typified by the Riggs-Weiss work. Such so-called "anti-Stokes" fluorescence, according to currently accepted theories, occurs as long as the exciting light excites a specific fluorescence at all, so that the whole band of fluoresced light, including any part thereof in the far ultraviolet and/or of shorter wave length than the exciting light, is emitted. Moreover, it is evident to one versed in the pertinent art and provided with the benefit of this disclosure that "screens" of material generally similar to Film F-41—that is, screens for converting ultraviolet energy into energy having wave lengths closer toward the visible and infrared regions of the spectrum—have particular utility where ultraviolet radiation constitutes an appreciable proportion of the incident light, as in tropical latitudes, at high altitudes, and even more as in outer space. (See Koller, "Ultraviolet Radiation," John Wiley & Sons, Inc., 1952.) The utility of fluorescent coatings (i.e., radiation filter elements, in this specification) for changing the spectral-response characteristics of photocells, for example, becomes evident in the light of this disclosure, and should have particular utility as on space ships and space stations; more mundane applications are also evident in the light of this disclosure.

In the remaining examples of this specification, various examples of performance of my invention are set forth. In many of these examples, the spectral-response characteristics of photocells were studied, and the spectral distribution of the radiation incident on the photocells was changed by interposing between the photocells and the light sources employed filters consisting of organic plastic substance at least partially transparent to the light involved, said plastic substance containing one or more fluorescent materials of the type and class including optical brightening materials but not excluding fluorescent dyestuffs with various substantial absorption capacity in the visible spectrum, optionally sensitized by metastable electronic material such as metallic ions, said metallic ions preferably being a mixture, such as rare earth ions, having closely related electronic structures. The electrical effects obtained, of course, arise from the effect of these filters on light prior to incidence on the photocell itself, and it will be evident to one versed in the art and provided with the benefit of this disclosure that chemical effects, analogous to the Riggs-Weiss dissociation of water set forth above, could also be obtained with those filters described below which give a sensible yield, for example, of ultraviolet waves on excitation by incident light in, for example, the visible range. For chemical and/or electrical effects of the kind set forth herein as produced from various types and wave lengths of light, I have found the following especially useful: (1) a composition of matter consisting of organic plastic and a plurality of fluorescent materials having at least one fluorescence band in the ultraviolet region of the spectrum at wave lengths shorter than major absorption bands of any other major constituent of the composition and also having at least one major absorption band capable of giving rise to said fluorescence band in the ultraviolet region of the spectrum, said absorption band overlapping at least one major fluorescence band of other fluorescent material in the composition, and (2) a construction consisting of a plurality of layers each comprising organic plastic and fluorescent material, each layer in said construction being preferably substantially transparent to light in at least the near ultraviolet and visible regions of the spectrum except in those regions of absorption bands which give rise to fluorescence bands from the layer, the external layer on one side of the construction having at least one major absorption band in the visible region of the spectrum, the external layer on the other side of the construction having at least one major fluorescence band in the ultraviolet region of the spectrum, and the internal layers of the construction being arranged in such a sequence that each has a major absorption band overlapping a major fluorescence band of the layer on its one side, and a major fluorescence band overlapping a major absorption band of the layer on its other side. Acrylic substance performs in excellent fashion down to the region in the ultraviolet at which it becomes opaque; other plastics are applicable, with less synergism with dyestuff generally, over a somewhat broader range.

Various of the films, produced as described above, and various combinations of these films, in various sequences, were then tested for effectiveness in converting light to mixtures of wave lengths and intensities other than incident, by using these films individually and in multiple-layer constructions in various sequences, as filters interposed between the light source and either a selenium or silicon photocell.

The ultraviolet light source employed was a 275-watt mercury-arc ("sun") lamp of the kind commonly used in homes for tanning.

The infrared source employed was a 275-watt "heat" lamp of the kind commonly employed in homes.

The "white" light used was that obtained from an ordinary 100-watt incandescent bulb of the kind ordinarily used in homes.

"Sunlight," as used herein as a light source, refers to light obtained by exposure of the filters and photocells at 90° to the direction of the rays from the sun, so that the sun rays hit both the cell and the filter as perpendicularly as possible. Measurements set forth herein were done on a clear day, between 2 p.m. and 3 p.m. local standard time, about 10 days after the vernal equinox, in a suburban location approximately 45°3' north of the equator.

In all cases, the filters employed were placed right on top of the photocell, or actually coated on the photocell. The light source, in the case of the ultraviolet and infrared light sources, was mounted 54 inches away from the film or filter; in the case of the incandescent light source, the source was mounted 5½ inches away from the filter.

In each case, the circuit employed was as follows: photo-cell-to-ammeter; ammeter-to-resistor (33 ohms); resistor (33 ohms) -to-photocell. A sensitive voltmeter was connected across the resistor.

The selenium cell used in my measurements produced an output current of 77 microamperes at 100 ohms resistance and 100 foot-candles, from a photosensitive area of approximately 0.26 square inch, with a spectral response running from 220 to 780 millimicrons and peak response at about 550 millimicrons.

The silicon cell used in my measurements produced an output current of 10 to 16 milliamperes at 0.3 to 0.45 volt from an enclosed area of photosensitivity somewhat less than 1 square inch, in full sunlight using conventional volt and milliampere meters, with spectral response running from about 450 to about 990 millimicrons and peak response in the range of 750 to 850 millimicrons.

Light conversions by means of the various films and combinations of films listed below were also done in full sunlight on the silicon photocell, but the measured values did not follow an entirely consistent pattern—perhaps because of atmospheric disturbances and perhaps in part because of the low concentration of fluorescent dyestuff in the filters under conditions of high-intensity illumination—and hence values for sunlight conversions are not recorded in the table following.

In all cases in the following table in which several film numbers are shown in the same example, the light was passed through all of the films indicated, in the same sequence, from light source to photocell, as the sequence of film numbers reads from left to right, or, if the sequence is given on two lines, as the sequence of film numbers given reads: first line—left to right; then, second line—left to right; and so forth.

It will be appreciated to those skilled in the art and provided with the benefit of this disclosure that analogues of the following examples utilizing photocells in many instances could be run just as successfully with a photochemical cell, rather than a photocell, constituting or comprising the photosensitive element of my radiation converter.

| Exam- No. | Film No. | Milliamperes of Current Produced on Excitation of Photocell by Various Kinds of Light ||||||
|---|---|---|---|---|---|---|---|
| | | Ultraviolet || Incandescent || Infrared ||
| | | Silicon cell | Selenium cell | Silicon cell | Selenium cell | Silicon cell | Selenium cell |
| 2 | | | | | | | |
| 3 | 12 | 0.45 | 0.11 | 2.4 | 0.21 | 2.1 | 0.10 |
| 4 | 42 | 0.36 | 0.06 | 2.4 | 0.20 | 1.0 | 0.08 |
| 5 | 43 | 0.42 | 0.11 | 2.4 | 0.22 | 2.1 | 0.10 |
| 6 | 13 | 0.42 | 0.11 | 2.4 | 0.20 | 2.1 | 0.11 |
| 7 | 14 | 0.45 | 0.11 | 2.4 | 0.20 | 2.1 | 0.11 |
| 8 | 15 | 0.45 | 0.11 | 2.4 | 0.21 | 2.1 | 0.11 |
| 9 | 45 | 0.35 | 0.06 | 2.4 | 0.15 | 2.1 | 0.10 |
| 10 | 17 | 0.44 | 0.10 | 2.4 | 0.21 | 2.1 | 0.10 |
| 11 | 18 | 0.42 | 0.10 | 2.4 | 0.21 | 2.1 | 0.10 |
| 12 | 46 | 0.41 | 0.11 | 2.4 | 0.25 | 2.1 | 0.10 |
| 13 | 47 | 0.35 | 0.05 | 2.4 | 0.15 | 2.1 | 0.08 |
| 14 | 19 | 0.41 | 0.10 | 2.4 | 0.22 | 2.1 | 0.10 |
| 15 | 20 | 0.41 | 0.11 | 2.4 | 0.22 | 2.1 | 0.10 |
| 16 | 49 | 0.41 | 0.11 | 2.4 | 0.20 | 2.0 | 0.10 |
| 17 | 50 | 0.34 | 0.05 | 2.3 | 0.14 | 2.0 | 0.07 |
| 18 | 51 | 0.40 | 0.10 | 2.3 | 0.20 | 2.1 | 0.10 |
| 19 | 52 | 0.39 | 0.10 | 2.3 | 0.20 | 2.1 | 0.10 |
| 20 | 53 | 0.40 | 0.10 | 2.3 | 0.20 | 2.1 | 0.10 |
| 21 | 54 | 0.42 | 0.11 | 2.3 | 0.20 | 0.21 | 0.10 |
| 22 | 55 | 0.40 | 0.10 | 2.3 | 0.20 | 0.21 | 0.10 |
| 23 | 56 | 0.40 | 0.10 | 2.3 | 0.20 | 0.21 | 0.10 |
| 24 | 57 | 0.36 | 0.06 | 2.3 | 0.15 | 0.21 | 0.08 |
| 25 | 58 | 0.39 | 0.09 | 2.3 | 0.19 | 0.21 | 0.10 |
| 26 | 59 | 0.40 | 0.10 | 2.3 | 0.20 | 0.21 | 0.10 |
| 27 | 60 | 0.38 | 0.10 | 2.2 | 0.21 | 0.21 | 0.10 |
| 28 | 61 | 0.35 | 0.05 | 2.3 | 0.14 | 0.21 | 0.07 |
| 29 | 62 | 0.40 | 0.09 | 2.3 | 0.19 | 0.21 | 0.09 |
| 30 | 63 | 0.40 | 0.10 | 2.3 | 0.20 | 0.21 | 0.10 |
| 31 | 64 | 0.33 | 0.04 | 2.3 | 0.12 | 2.1 | 0.06 |
| 32 | 22 | 0.42 | 0.11 | 2.4 | 0.22 | 2.2 | 0.10 |
| 33 | 23 | 0.44 | 0.10 | 2.4 | 0.21 | 2.2 | 0.10 |
| 34 | 24 | 0.43 | 0.10 | 2.4 | 0.21 | 2.2 | 0.10 |
| 35 | 25 | 0.42 | 0.10 | 2.3 | 0.21 | 2.1 | 0.10 |
| 36 | 26 | 0.43 | 0.11 | 2.4 | 0.21 | 2.1 | 0.10 |
| 37 | 28 | 0.42 | 0.10 | 2.3 | 0.20 | 2.3 | 0.10 |
| 38 | 30 | 0.42 | 0.10 | 2.4 | 0.20 | 2.3 | 0.10 |
| 39 | 32 | 0.32 | 0.07 | 2.0 | 0.18 | 2.0 | 0.07 |
| 40 | 12–42 | 0.36 | 0.06 | 2.3 | 0.13 | 2.2 | 0.07 |
| 41 | 42–12 | 0.35 | 0.06 | 2.3 | 0.13 | 2.2 | 0.07 |
| 42 | 12–42–43 | 0.31 | 0.05 | 2.2 | 0.12 | 2.2 | 0.06 |
| 43 | 42–43–12 | 0.33 | 0.05 | 2.2 | 0.12 | 2.2 | 0.06 |
| 44 | 43–42–12 | | | | 0.12 | 2.2 | 0.06 |
| 45 | 45–43–42–12 | 0.30 | 0.04 | | | | |

| Exam-No. | Film No. | Milliamperes of Current Produced on Excitation of Photocell by Various Kinds of Light | | | | | |
|---|---|---|---|---|---|---|---|
| | | Ultraviolet | | Incandescent | | Infrared | |
| | | Silicon cell | Selenium cell | Silicon cell | Selenium cell | Silicon cell | Selenium cell |
| 46 | 43-12-45-42 | 0.30 | 00.4 | | | | |
| 47 | 45-42-12-17-18 | 0.28 | 0.03 | | | | |
| 48 | 18-12-17-42-45 | 0.29 | 0.03 | | | | |
| 49 | 47-19-18-12-17-42-45 | 0.26 | | | | | |
| 50 | 12-17-42-45-47-19-18 | 0.27 | | | | | |
| 51 | 46-13-43-14-15 | 0.35 | | | | | |
| 52 | 14-15-43-46-13 | 0.33 | | | | | |
| 53 | 49-50 | 0.33 | 0.045 | | 0.11 | | |
| 54 | 50-49 | 0.34 | 0.045 | | 0.11 | | |
| 55 | 50-51 | 0.34 | 0.04 | | 0.11 | | |
| 56 | 51-50 | 0.34 | 0.04 | | 0.10 | | |
| 57 | 49-50-51 | 0.32 | | | 0.10 | | |
| 58 | 51-50-49 | 0.30 | | | | | |
| 59 | 57-50-51-49 | 0.28 | | | | | |
| 60 | 51-49-57-50 | 0.28 | | | | | |
| 61 | 57-50-49-58-59-45 | 0.25 | | | | | |
| 62 | 59-49-58-50-57-45 | 0.25 | | | | | |
| 63 | 14-52 | 0.39 | | | | | |
| 64 | 52-14 | 0.41 | | | | | |
| 65 | 45-23 | | | | | | 0.07 |
| 66 | 23-45 | | | | | | 0.07 |
| 67 | 22-23 | 0.42 | 0.10 | | | | |
| 68 | 23-52 | 0.43 | 0.10 | | | | |
| 69 | 23-60 | 0.40 | 0.08 | | | | |
| 70 | 60-23 | 0.40 | 0.08 | | | | |
| 71 | 45-60-23 | | | 2.1 | 0.11 | 2.1 | |
| 72 | 23-60-45 | | | 2.1 | 0.11 | 2.1 | |
| 73 | 60-45-53 | | | 2.1 | 0.11 | 2.1 | 0.05 |
| 74 | 45-23 | 0.36 | | | | | |
| 75 | 23-45 | 0.36 | | | | | |
| 76 | 45-60-23 | 0.32 | | | | | |
| 77 | 23-60-45 | 0.32 | | | | | |
| 78 | 43-13-15-17-18 | 0.34 | | | | | |
| 79 | 43-13-15-17-18-47 | 0.28 | | | | | |
| 80 | 47-42-18-15-17-18-46 | 0.28 | | | | | |

Example 81

In this example, various combinations and sequences of films listed in the tables above were tested in sunlight as before, with the same testing equipment and circuitry, except that the selenium cell used in this example was mounted in a molded plastic case and had a size of approximately 1 inch square, and a 22-ohm resistor, rather than a 33-ohm resistor, was mounted across the photocell. In direct sunlight with this equipment, it was possible to show that variations in current and power output did occur depending on the sequence in which the sunlight was passed through the films on its way to the photocell involved, and the day was so clear and bright that it did not seem probable that these differences were associated with atmospheric disturbances.

In the examples following, the great superiority of optical brightening material or mixed brighteners, optionally sensitized with rare earth salt, or even rare earth salt alone in some cases, over the colored fluorescent dyestuffs of Sellei (U.S. Patent 2,190,890) in affecting the growth and/or appearance of chlorophyll-containing organisms is made clear, and direct application of the principles of my invention in other biological systems is made obvious in the light of this disclosure. (See, for example, in the light of this disclosure, the evident applicability of optical brightening materials in producing electricity by bacterial action under the influence of light, by the method and class of device being studied by Dr. Frederick Sisler of Washington, D.C., and Dr. Robert Sarbacher, said class of device being described in Life magazine as a "Battery Powered by Bugs"; also, see Arnon, Tagawa, and Tauijimoto, Science, 140, 378 (1963); St. Paul Sunday Pioneer Press, first section, page 17, issue of Feb. 17, 1963: "Microwaves Release Body Photon"; Chemical & Engineering News, Sept. 24, 1962, pp. 56–8; Calvin, Science, 135, 879 seq. (1962); Time, Oct. 26, 1959, pages 74–79.)

Example 82

In this example, three pots of loose black soil from Arden Hills, Minnesota, were planted with 12 radish seeds (obtained from a well known seedsman) per pot, and exposed to the rays of the sun, at aproximately 45° N. latitude, for approximately 4 hours per day over a period of 30 days. On the first day, 100 milliliters of aqueous liquid was supplied to each pot. In each case, the first pot was sprinkled (on top of the plants, if any) with an aqueous solution having 1 percent by weight of "Optical Brightening Material III," a commercial optical brightening material equivalent for the purposes of this invention to the above-described "Optical Brightening Material I"; the second pot was irrigated at the base of the plants, if any, with the aforesaid aqueous solution having 1 percent by weight of "Optical Brightening Material III"; and the third pot was irrigated (at the base of the plants, if any) with plain water taken from a well 92 feet deep in Arden Hills, Minn. At the end of the experiment, all of the plants were uprooted from all pots and carefully washed and weighed. The highest total plant weight, by an appreciable margin, was obtained in the case of the pot in which a solution of optical brightening material had been supplied by sprinkling. Generally similar results were obtained in growing plants of the same kind under clear acrylic films, and comparing the size of the plant obtained with those obtained under acrylic film containing from 5 to 20 percent by weight of optical brightening material; plants grown under the film loaded with optical brightening material tended to be larger. These indications, obtained with radishes, were confirmed in parallel tests on carrots.

Example 83

Two lots of flower preservative were made up as follows:

83A

| | Parts |
|---|---|
| MnCl$_2$ | 20 |
| MgCl$_2$ | 20 |
| NaCl | 20 |
| Chloral hydrate | 40 |

83B

| | |
|---|---|
| MnCl$_2$ | 20 |
| MgCl$_2$ | 20 |
| NaCl | 20 |
| Chloral hydrate | 40 |
| Optical brightening material III | 30 |

These two preservative formulations were then dispersed at various concentrations in gellable compositions adapted to produce a porous sheath around the base of the stem of cut plants—e.g., thin syrups of polyvinyl alcohol/starch containing small particles of vermiculite, and gellable by dipping the sheath around the plant stem base in saturated solution of borax or such like. Both 83A and 83B are of interest for this type of service, but the formulation typified by 83B offers the possibility of increased brightness in the flower, particularly in the leafy structures, and in the case of some flowers, offers the possibility of changing the color of gross parts of the flower by merely substituting appropriate dyestuff for the Optical Brightening Material III. A certain amount of gelling may also be observed in the dispersing step, particularly with the manganous salt.

Example 84

A cut *Pothos aureus* plant was immersed in water at the base of the stem only, and after 1 week was thriving. This plant served as a control for Examples 85 to 89 inclusive.

Example 85

A cut *Pothos aureus* plant was immersed at the base of its stem only in an aqueous solution containing 1 percent by weight of fluorescein. Results: 48 hours—slightly shiny; 120 hours—veins red; 144 hours—dying.

Example 86

A cut *Pothos aureus* plant was immersed at the base of its stem only in aqueous solution having 1 percent by weight of Optical Brightener III. Results: 48 hours—shiny; 120 and 144 hours—dying.

Example 87

A cut *Pothos aureus* plant was immersed at the base of its stem only in an aqueous mixture containing 1 percent by weight of Rare Earth Salt VI. Results: 48 hours—shiny; 120 hours—excellent; 180 hours—excellent.

Example 88

A cut *Pothos aureus* plant was immersed at the base of its stem only in an aqeuous mixture containing 1 percent by weight of fluorescein and also 1 percent by weight of Rare Earth Salt VI. Results: 144 hours—no change.

Example 89

A cut *Pothos aureus* plant was immersed at the base of its stem only in an aqueous mixture containing 1 percent by weight of Optical Brightener III and 1 percent by weight of Rare Earth Salt VI. Results: 48-hours—no change; 144 hours—veins showing.

Example 90

A cut *Pothos aureus* plant was immersed at the base of its stem only in an aqueous mixture containing 1 percent by weight of Optical Brightener III and 2 percent by weight of Rare Earth Salt VI. Results: 48 hours—no change; 144 hours—veins showing.

Example 91

Four lots of twelve string beans each, obtained from a well known seedsman, were grown under conditions approximating as closely as possible natural outdoor sunlight. In each lot of twelve bean plants, one set was irrigated with water only, one set with water containing fluorescein at concentrations varying, from test to test, from 0.001 percent to 1 percent, and the final set was irrigated with "Optical Brightening Material I" or "Optical Brightening Material III," at concentrations varying, from test to test, from 0.001 percent to 1 percent. At the higher concentrations of either fluorescein or of brightening materials, all plants either failed to sprout or quickly died after sprouting; but at low to intermediate concentrations (in the range of 0.01 to 0.001 percent by weight), the bean plants irrigated with water containing optical brightening material sprouted more rapidly and grew more rapidly than the plants in the other two sets of the lot.

In this specification, I have sometimes shortened my terms, for convenience of expression and/or tabulation, after defining them; thus, "Optical Brightening Material III" may be referred to as "Optical Brightener III." In such shortened notation, the Roman numeral controls.

It will be evident to those versed in the art that the multiple-layer constructions comprising organic polymer and a plurality of fluorescent dyestuffs preferably should be based on organic plastic that is substantially transparent at least in the near ultraviolet and visible regions of the spectrum, and on organic fluorescent materials, and that for best efficiency these multiple-layer constructions will tend to have a preferred direction of action—for example, to convert light from long wave length to shorter wave length, the light should preferably strike the construction on the side with at least one major absorption band in the long range of wave lengths, with this external layer then fluorescing at a shorter wave length that is absorbed by the next layer in the light path, the next layer fluorescing at a still shorter wave length, and so on through the multiple-layer construction. An opposite plan would be followed, of course, in reversing the process—that is, in passing a beam through a construction of multiple layers arranged in such a manner that the layer on the side on which the beam of electromagnetic radiation initially impinged would have substantial absorption capacity in the ultraviolet; it would then fluoresce at shorter wave length in giving up its energy to the next layer in the line, which would fluoresce at a still longer wave length, and so on through the construction. Fluorescence backwards from the direction of the main beam may be minimized by employing metallic layers, or other layers of reflecting character, having a thickness such that they will reflect selectively the backwards fluorescing light, and substantially pass the light to be absorbed by the multi-layer element involved. As indicated, these features will be evident to those versed in the art and provided with the benefit of my disclosure, as will also be the fact that even in my more or less homogeneous compositions comprising organic plastic and a plurality of fluorescent materials, organic plastic substantially transparent in at least most of the visible and near ultraviolet range of the spectrum, and organic fluorescent materials, will be preferable.

Although it is true that my invention, as set forth herein, is described chiefly in terms of organic materials of construction, and in terms of wave lengths chiefly in the near infrared, visible, and near ultraviolet regions of the spectrum, the same principles are applicable with inorganic glasses and fluorescent materials, with the great exception that it is more difficult by far to match the absorption and fluorescence wave lengths in going from one species of fluorescent material to the next, and one simply does not obtain the peculiar "modlecular-band" synergistic effects obtained in preferred embodiments of my invention as set forth herein. It will be evident to those versed in the art and provided with the benefit of this disclosure that inorganic glasses that are substantially transparent at least in the near ultraviolet and visible regions of the spectrum are analogues of organic plastic that is substantially transparent at least in the near ultraviolet and visible regions of the spectrum; thus, my term "solid polymeric material that is substantially transparent at least in the near untraviolet and visible regions of the spectrum" is intended to include both organic plastic material and inorganic glasses having the specified transparency characteristics. (See definitions of "glass" and "polymeric" in "Webster's Seventh New Collegiate Dictionary," G. C. Merriam Company, Springfield, Mass., 1967.)

It should be emphasized that the effects I have observed in the practice of my invention are entirely unexpected, and in some embodiments are actually quite the reverse of what those versed in the pertinent art migh expect. None of the prior art of which I am aware offers any anticipation of these synergistic effects, or any explanation thereof. Finally, it should be understood that modifications and variations of my invention, as herein described, may be effected without departing from the scope of the novel concepts and such like of this invention, and that I do not intend that the breadth of my invention be limited in any way by the speculations, implicit or otherwise, herein contained concerning mechanisms which might usefully be considered in attempting to explain the remarkable synergistic effects actually observed.

I claim:

1. A construction for converting electromagnetic radiation of wavelength between about 2900 A. and about 15,000 A. into electromagnetic radiation of different wavelength, comprising, in combination, two substantially parallel layers, each comprising (a) solid polymeric material that is substantially transparent at least in the near ultraviolet and visible regions of the spectrum, and (b) fluorescent substance, said two layers containing different fluorescent substances, and disposed in optical relationship and adjacent to each other, each layer being substantially transparent to electromagnetic radiation in at least part of the visible range of the spectrum between about 3900 A. and about 7600 A., each layer having a major adsorption band in the spectrum of wavelengths between about 2900 A. and about 15,000 A., and each layer having a major fluorescence band in a region of the spectrum different from a major absorption band, a major absorption band of the one layer substantially overlapping in the spectrum of wavelengths of a major fluorescence band of the other layer.

2. A radiation converter comprising, in combination and adjacent to one another, a photosensor and a construction according to claim 1, disposed in optical relationship to each other, the fluorescence band of the layer nearest to the photosensor substantially overlapping the spectral response curve of the photosensor.

3. A radiation converter according to claim 2, in which the photosensor is a photocell.

4. A radiation converter according to claim 2, in which the photosensor is a photochemical cell.

5. A construction according to claim 1, said construction having at least one layer comprising acrylic plastic, and fluorescent dyestuff.

6. A radiation converter according to claim 2, said converter having at least one layer comprising acrylic plastic and fluorescent dyestuff.

7. A construction according to claim 1, said construction having at least one layer comprising acrylic plastic, a plurality of organic fluorescent materials, and molecularly dispersed rare-earth salt, the rare-earth ions of said rare-earth salt being arranged randomly with respect to each other.

8. A radiation converter comprising, in combination and adjacent to each other, a photosensor and a construction according to claim 7, disposed in optical relationship to each other, the fluorescence band of the layer nearest to the photosensor substantially overlapping the spectral response curve of the photosensor.

9. A radiation converter according to claim 2, in which the photosensor is a photochemical system.

10. A sandwich-type construction for converting electromagnetic radiation of wavelength between about 2900 A. and 15,000 A. into electromagnetic radiation of different wavelength, comprising, in combination, two substantially parallel external layers, each comprising (a) solid polymeric material that is substantially transparent at least in the near ultraviolet and visible regions of the spectrum and (b) fluorescent substance, said two layers containing different fluorescent substances and disposed in optical relationship to each other, and an internal layer comprising (a) solid polymeric material that is substantially transparent at least in the near ultraviolet and visible regions of the spectrum and (b) fluorescent substance, said internal layer being interposed between said two external layers and adjacent to said external layers, each of the three layers being disposed in optical relationship to the other two layers, each layer being substantially transparent to electromagnetic radiation at least in part of the visible spectrum between about 3900 A. and 7600 A., each layer having a major absorption band in the spectrum of wavelengths between about 2900 A. and 15,000 A., and each layer having a major fluorescence band in a region of the spectrum different from a major absorption band, a major absorption band of said internal layer substantially overlapping in the spectrum of wavelengths of a major fluorescence band of one external layer and a major fluorescence band of said internal layer substantially overlapping in the spectrum of wavelengths of a major absorption band of the other external layer, a major absorption band of each external layer being in a region of the spectrum substantially removed from a major fluorescence band of the other layer.

11. A sandwich-type construction according to claim 10, in which a plurality of internal layers, each comprising solid polymeric material that is substantially transparent at least in the near ultraviolet and visible regions of the spectrum, is interposed between two external layers of the construction, each such internal layer being disposed in optical relationship to all of the other layers of the construction, and each such internal layer being adjacent to other layers of the construction.

12. A radiation converter comprising, in combination, a photosensor and a construction according to claim 10, disposed in optical relationship to each other, the fluorescence band of the layer nearest to the photosensor substantially overlapping the spectral response curve of the photosensor.

13. A radiation converter comprising, in combination, a photosensor and a construction according to claim 11, disposed in optical relationship to each other, the fluorescence band of the layer nearest to the photosensor substantially overlapping the spectral response curve of the photosensor.

References Cited

UNITED STATES PATENTS

| | | | |
|---|---|---|---|
| 1,108,638 | 8/1914 | Stille | 250—211 X |
| 2,386,855 | 10/1945 | Horback | 250—86 X |
| 2,603,757 | 7/1952 | Sheldon | 250—213 X |
| 3,011,978 | 12/1961 | Gosnell et al. | 252—301.3 |
| 3,043,709 | 7/1962 | Amborski | 47—17 X |
| 3,128,385 | 4/1964 | Scharf et al. | 250—219 |
| 3,185,650 | 5/1965 | Gurnee et al. | 252—301.3 |
| 3,207,910 | 9/1965 | Hirschfeld et al. | 250—226 |
| 3,243,595 | 3/1966 | Allington | 88—112 X |

OTHER REFERENCES

Summer: Photosensitors, Chapman and Hall Ltd., 1957; pp. 389 to 392; QC–715–S8.

WALTER STOLWEIN, *Primary Examiner.*

U.S. Cl. X.R.

250—71